(12) United States Patent
Ogiso et al.

(10) Patent No.: US 11,752,821 B2
(45) Date of Patent: Sep. 12, 2023

(54) SPRING

(71) Applicant: CHUO HATSUJO KABUSHIKI KAISHA, Nagoya (JP)

(72) Inventors: Hiroyuki Ogiso, Nagoya (JP); Kazuyoshi Nono, Nagoya (JP); Yuichi Nakazawa, Nagoya (JP); Hideo Yamashita, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 486 days.

(21) Appl. No.: 16/975,376

(22) PCT Filed: Mar. 6, 2019

(86) PCT No.: PCT/JP2019/008923
§ 371 (c)(1),
(2) Date: Aug. 24, 2020

(87) PCT Pub. No.: WO2019/172329
PCT Pub. Date: Sep. 12, 2019

(65) Prior Publication Data
US 2020/0391565 A1    Dec. 17, 2020

(30) Foreign Application Priority Data

Mar. 7, 2018  (JP) .................. 2018-040752
Mar. 7, 2018  (JP) .................. 2018-040753

(51) Int. Cl.
*B60G 11/52*    (2006.01)
*F16F 3/12*     (2006.01)
*F16F 1/12*     (2006.01)

(52) U.S. Cl.
CPC ............ *B60G 11/52* (2013.01); *F16F 1/12* (2013.01); *F16F 3/12* (2013.01); *B60G 2206/42* (2013.01);

(Continued)

(58) Field of Classification Search
CPC ............ B60G 11/52; B60G 2206/42; B60G 2206/70; B60G 2206/724; B60G 2206/73;
(Continued)

(56) References Cited

U.S. PATENT DOCUMENTS 2,126,707 A * 8/1938 Schmidt ............... F16F 1/3814
267/141.1
2,605,099 A * 7/1952 Brown ..................... F16F 3/12
220/666

(Continued)

FOREIGN PATENT DOCUMENTS

CN     102474688 A    5/2012
CN     103299079 A    9/2013
(Continued)

OTHER PUBLICATIONS

International Search Report and Written Opinion for International application No. PCT/JP2019/008923, dated May 7, 2019, ISA/JP.
(Continued)

*Primary Examiner* — Robert A. Siconolfi
*Assistant Examiner* — James K Hsiao
(74) *Attorney, Agent, or Firm* — ArentFox Schiff LLP

(57) ABSTRACT

This spring used for a suspension device for a vehicle is provided with: a metal wire material which constitutes a spring section and which has a cover layer provided on the surface thereof; and a seat section which is subjected to a load acting on the spring section, is formed from an elastically deformable material, has a groove section into which the wire material fits, and is bonded to the wire material by an adhesive. The minimum thickness of the portion of the adhesive, which protrudes from the groove section, is greater than or equal to the thickness of an adhesion layer formed in the groove section.

4 Claims, 8 Drawing Sheets

(52) U.S. Cl.
CPC .... *B60G 2206/70* (2013.01); *B60G 2206/724* (2013.01); *B60G 2206/73* (2013.01); *B60G 2206/821* (2013.01); *B60G 2800/162* (2013.01); *F16F 2224/02* (2013.01); *F16F 2224/025* (2013.01); *F16F 2224/0208* (2013.01); *F16F 2226/042* (2013.01); *F16F 2230/0005* (2013.01); *F16F 2232/08* (2013.01)

(58) Field of Classification Search
CPC . B60G 2206/821; B60G 280/162; F16F 1/12; F16F 3/12; F16F 2224/02; F16F 2224/0208; F16F 2224/025; F16F 2226/042; F16F 2230/0005; F16F 2232/08
See application file for complete search history.

(56) References Cited

U.S. PATENT DOCUMENTS

| | | | | |
|---|---|---|---|---|
| 3,761,069 | A * | 9/1973 | Moore | A61M 5/1415 267/152 |
| 3,939,674 | A * | 2/1976 | Czech | F16F 3/12 68/23.3 |
| 4,172,590 | A * | 10/1979 | Jarret | F16F 3/12 267/152 |
| 4,595,445 | A * | 6/1986 | Hornbach | C08G 18/5048 156/308.2 |
| 4,732,372 | A * | 3/1988 | Dickhart, III | B60G 11/16 267/287 |
| 4,763,882 | A * | 8/1988 | Nishiyama | F16F 3/12 267/152 |
| 4,771,996 | A * | 9/1988 | Martinez, Jr. | F16F 9/58 267/153 |
| 4,779,850 | A * | 10/1988 | Paton | B60G 11/54 267/292 |
| 4,817,921 | A * | 4/1989 | Stevenson | F16F 3/12 280/124.179 |
| 4,869,471 | A * | 9/1989 | Schwarz | F16F 1/024 267/180 |
| 4,874,154 | A * | 10/1989 | Zimbone | F16F 3/12 267/140.4 |
| 4,886,256 | A * | 12/1989 | Nishiyama | B60G 15/07 267/221 |
| 5,203,849 | A * | 4/1993 | Balsells | F16F 3/12 267/1.5 |
| 5,421,565 | A * | 6/1995 | Harkrader | B60G 11/16 267/221 |
| 5,984,283 | A * | 11/1999 | Tsuiki | F16F 3/093 267/140.3 |
| 6,179,309 | B1 * | 1/2001 | Satou | B60G 3/20 280/124.179 |
| 6,237,901 | B1 * | 5/2001 | Bianchi | B60G 17/02 267/286 |
| 6,260,836 | B1 * | 7/2001 | Aoyama | B60G 15/063 267/221 |
| 7,806,392 | B2 * | 10/2010 | Ishikawa | B60G 15/068 267/221 |
| 9,234,555 | B2 * | 1/2016 | Nakamura | F16F 1/122 |
| 9,334,913 | B2 * | 5/2016 | Schüssler | B60G 11/14 |
| 9,777,787 | B2 * | 10/2017 | Teichmann | B29C 65/48 |
| 9,895,948 | B2 * | 2/2018 | Paulding | B60G 11/52 |
| 10,704,634 | B2 * | 7/2020 | Ohmura | B60G 11/16 |
| 10,899,188 | B2 * | 1/2021 | Okura | F16F 1/123 |
| 2008/0224371 | A1 * | 9/2008 | Brand | B60G 15/063 267/221 |
| 2010/0009086 | A1 * | 1/2010 | Tran | B05D 7/146 523/400 |
| 2010/0289199 | A1 * | 11/2010 | Lee | B60G 11/16 267/286 |
| 2011/0140327 | A1 * | 6/2011 | Imaizumi | F01L 3/10 267/174 |
| 2014/0117597 | A1 * | 5/2014 | Fujimoto | F16F 13/002 267/35 |
| 2014/0225319 | A1 * | 8/2014 | Schussler | B60G 15/062 156/60 |
| 2016/0016342 | A1 * | 1/2016 | Al-Dahhan | B29C 45/14311 264/162 |
| 2016/0052358 | A1 * | 2/2016 | Itsuji | B60G 11/52 267/33 |
| 2016/0333956 | A1 * | 11/2016 | Teichmann | F16F 1/06 |
| 2017/0015028 | A1 * | 1/2017 | Lee | C08L 75/04 |
| 2017/0015171 | A1 * | 1/2017 | Enomoto | B60G 11/52 |
| 2018/0340586 | A1 * | 11/2018 | Koba | F16F 1/3828 |
| 2018/0361424 | A1 * | 12/2018 | Koyama | F16F 1/06 |
| 2018/0362698 | A1 * | 12/2018 | Joo | C08G 18/7678 |
| 2019/0152361 | A1 * | 5/2019 | Matsushita | B60G 11/16 |
| 2019/0160906 | A1 * | 5/2019 | Umeno | B60G 11/14 |
| 2019/0275634 | A1 * | 9/2019 | White | B25J 9/0009 |
| 2020/0391565 | A1 * | 12/2020 | Ogiso | F16F 1/12 |
| 2020/0400205 | A1 * | 12/2020 | Ogiso | F16F 1/126 |
| 2021/0316587 | A1 * | 10/2021 | Shibata | B60G 11/16 |
| 2021/0339592 | A1 * | 11/2021 | Shibata | B60G 11/52 |

FOREIGN PATENT DOCUMENTS

| | | |
|---|---|---|
| CN | 104235246 A | 12/2014 |
| CN | 105383253 A | 3/2016 |
| CN | 105420670 A | 3/2016 |
| CN | 106151365 A | 11/2016 |
| JP | S57196836 U | 12/1982 |
| JP | S5835871 Y2 | 8/1983 |
| JP | S61177232 U | 11/1986 |
| JP | 11117982 A | 4/1999 |
| JP | 2011069446 A | 4/2011 |
| JP | 2015190538 A | 11/2015 |
| JP | 2016056895 A | 4/2016 |
| JP | 2017015249 A | 1/2017 |

OTHER PUBLICATIONS

Decision to Grant a Patent in JP2018040752, dated Aug. 31, 2021, 3 pages.
Decision to Grant a Patent in JP2018040753, dated Sep. 7, 2021, 3 pages.
First Office Action in CN201980006898.4, dated May 21, 2021, 6 pages.
International Search Report and Written Opinion in PCT/JP2019/008917, dated May 7, 2019, 6 pages.
Office Action in CN201980006897, dated May 7, 2021, 6 pages.

* cited by examiner

SPRING

CROSS-REFERENCE TO RELATED APPLICATIONS

This application is a 371 U.S. national phase stage of PCT/JP2019/008923, filed Mar. 6, 2019, which claims priority to Japanese Patent Application No. 2018-40752 and Japanese Patent Application No. 2018-40753 filed with the Japan Patent Office on Mar. 7, 2018, the contents of each of which are incorporated herein by reference in their entireties.

FIELD OF THE INVENTION

The present disclosure relates to a spring, and in particular to a spring that can be used in a suspension device such as a suspension device for a vehicle.

BACKGROUND OF THE INVENTION

For example, in a spring device of an invention described in Patent Document 1, a coil spring made of metal and a holding member made of plastic are adhered via an adhesive. In the invention described in Patent Document 1, after the adhesive is applied to the holding member, the coil spring is adhered to the holding member by placing the coil spring on the adhesive-applied position.

PRIOR ART DOCUMENT

Patent Document

Patent Document 1: Japanese Patent Publication No. 2017-15249

SUMMARY OF THE INVENTION

Problems to be Solved by the Invention

In the spring device described in Patent Document 1, the coil spring may be damaged early for the following reasons.

In other words, after the adhesive is applied to the holding member, if the coil spring is placed on the adhesive-applied position, part of the applied adhesive is extremely likely to overflow from the adhered surfaces of the coil spring and the holding member.

Cracks may occur between the adhesive overflowing from the adhered surfaces (hereinafter referred to as the overflow part) and the adhesive existing on the adhered surfaces (hereinafter referred to as the adhesion layer), and the overflow part may be broken from the adhesion layer, due to factors such as vehicle vibration and changes over time.

In the case where the overflow part is broken, if load acts on the coil spring to deform the coil spring and the holding member, the overflow part is relatively displaced with respect to the coil spring. If the overflow part is displaced relative to the coil spring, the broken position of the overflow part and the coil spring rub against each other.

If the broken position of the overflow part and the coil spring rub against each other, a coating layer provided on the surface of the coil spring may be damaged, and hence the coil spring may be early damaged starting from the damaged position.

In view of the above points, the present disclosure discloses an example of a spring capable of suppressing early damage of a spring section constituted by a wire made of metal.

Means for Solving the Problems

A spring for a suspension device for a vehicle according to an aspect of the present disclosure comprises: a wire made of metal, constituting a spring section, and provided with a coating layer on its surface; and a seat section made of an elastically deformable material, bearing load acting on the spring section, having a groove section into which the wire is fitted, and adhered to the wire by an adhesive.

In the configuration described above, it is preferable that a minimum thickness dimension of the adhesive overflowing from the groove section is greater than or equal to a thickness dimension of an adhesion layer formed in the groove section.

This can suppress an excessively small thickness dimension of a boundary between the overflow part and the adhesion layer. Therefore, the breakage of the overflow part is suppressed, so that early damage of the spring section can be suppressed.

Even if there is an adhesive accumulation portion at an end portion of the groove section in a width direction, on which the adhesive is accumulated to restrict the flow of the adhesive, and the boundary between the overflow part and the adhesion layer can be suppressed from having an excessively small thickness dimension.

Therefore, even if there is an adhesive accumulation portion, the breakage of the overflow part can be suppressed, so that early damage of the spring section can be suppressed.

DETAILED DESCRIPTION OF THE INVENTION

Figure 1:
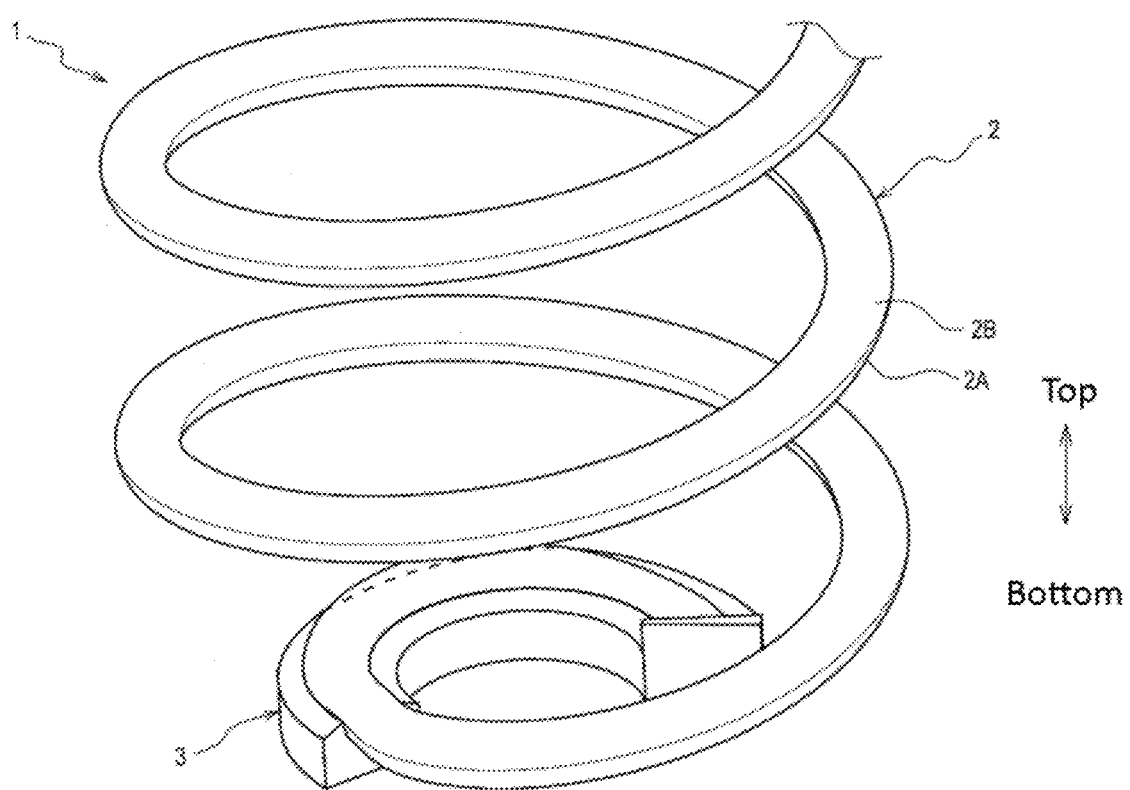
FIG. 1 is a diagram showing a spring according to a first embodiment of the invention.

The following "embodiment of the invention" shows an example of an embodiment falling within the technical scope of the present disclosure. In other words, the invention-specifying matters recited in the claims are not limited by specific structures, configurations, or the like shown in the following embodiments.

Arrows or the like indicating directions marked in the drawings are described to provide easy understanding of the relationships between the drawings. The invention described in this specification is not limited by the directions marked in the drawings.

A member or portion described at least with a reference numeral is provided at least one in number unless specified with the term "one" or the like. In other words, two or more such members may be provided when not specified with the term "one" or the like.

This embodiment is an example in which the spring of the present disclosure is applicable as a spring for a suspension device, such as a spring for a suspension device for a vehicle.

First Embodiment

1. Structure of Spring for Suspension Device

A spring 1 for a suspension device shown in FIG. 1 (hereinafter referred to as a spring 1) comprises at least a spring section 2 and a seat section 3. The spring section 2 is a spring constituted by a wire 2A made of metal.

A coating layer 2B covering the entire wire 2A is provided on the surface of the wire 2A. The spring section 2 of this embodiment is a coil spring formed in a coil shape. The coating layer 2B is a thin film formed from a resin such as a thermosetting resin by stoving varnish.

Figure 2:
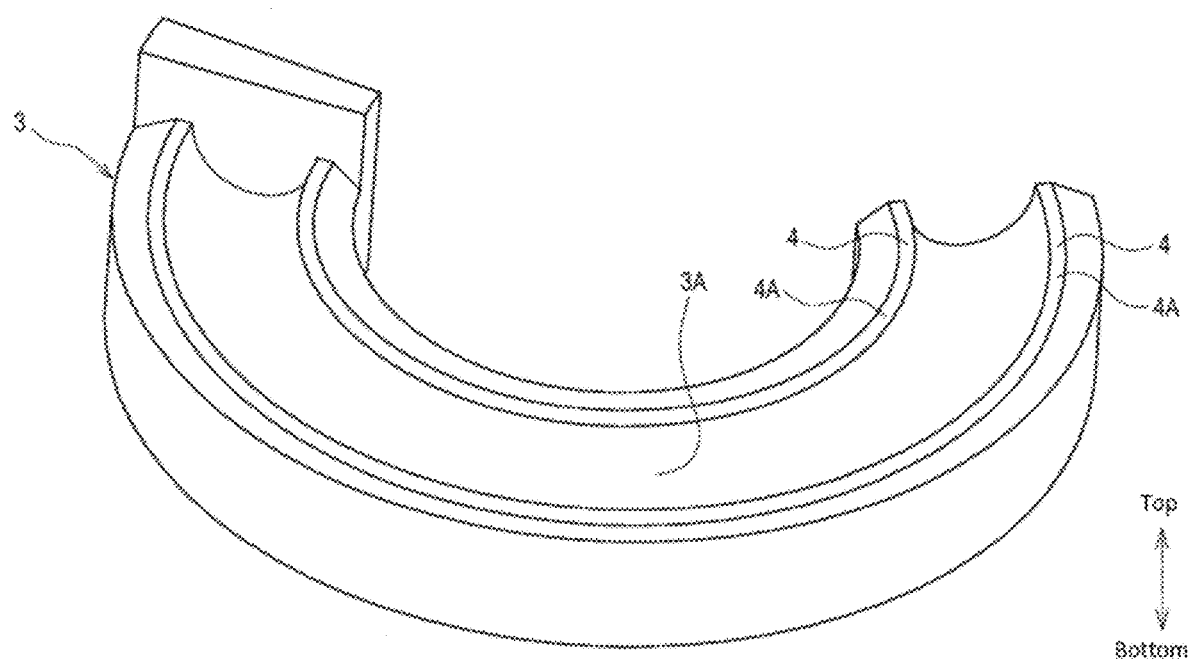
FIG. 2 is a diagram showing a seat section in the first embodiment.

The seat section 3 is a seat bearing load acting on the spring section 2, and is, for example, a rubber seat. The seat section 3 is made of an elastically deformable material. The material of the seat section 3 may exemplarily include at least one of rubber and resin. As shown in FIG. 2, the seat section 3 is provided with a groove section 3A into which a part of the wire 2A is fitted.

The groove section 3A is a groove into which a part of the wire 2A constituting an end turn section is fitted. In other words, the seat section 3 is arranged at an end of the spring section 2 configured in a coil shape in the coil axial direction, and is in contact with the part of the wire 2A constituting the end turn section (see FIG. 1). The wire 2A described below is the part of the wire 2A constituting the end turn section.

Figure 3:
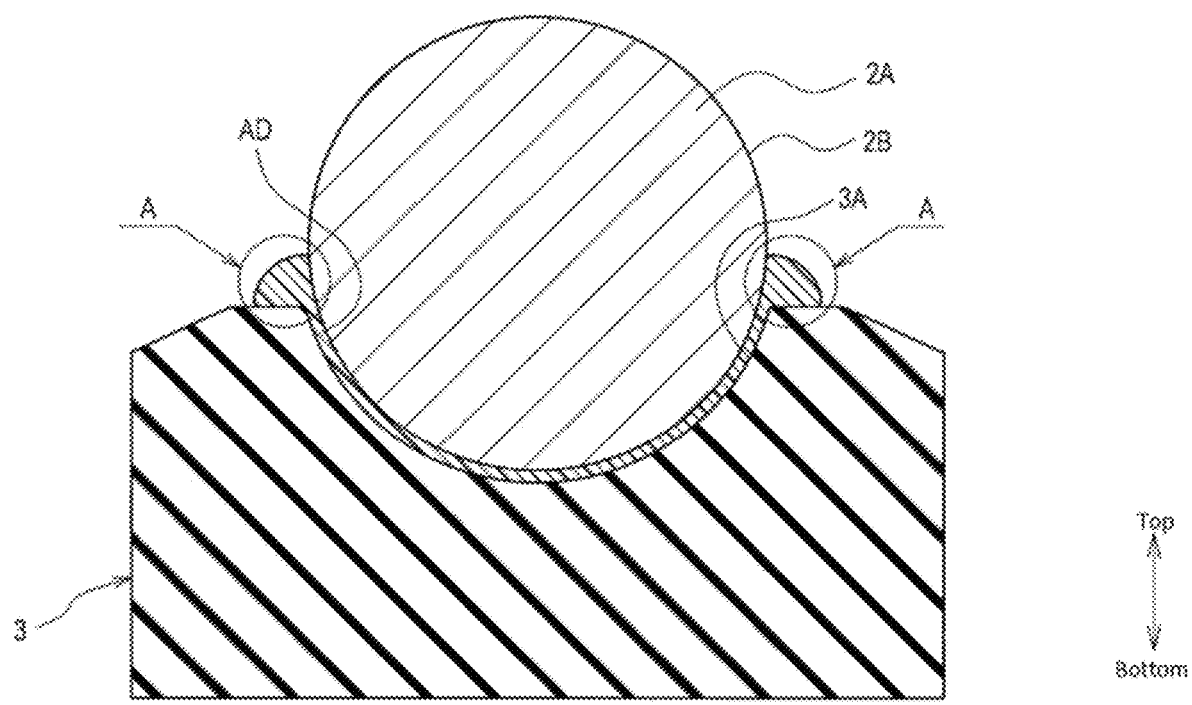
FIG. 3 is a diagram showing an adhesion layer and its vicinity in the first embodiment.

The wire 2A is adhered to the inner wall surface of the seat section 3, i.e., the groove section 3A, by an adhesive. Therefore, as shown in FIG. 3, an adhesion layer AD of the adhesive is formed between the wire 2A and the inner wall surface of the groove section 3A.

2. Configuration of an Adhesion Part

Figure 4:
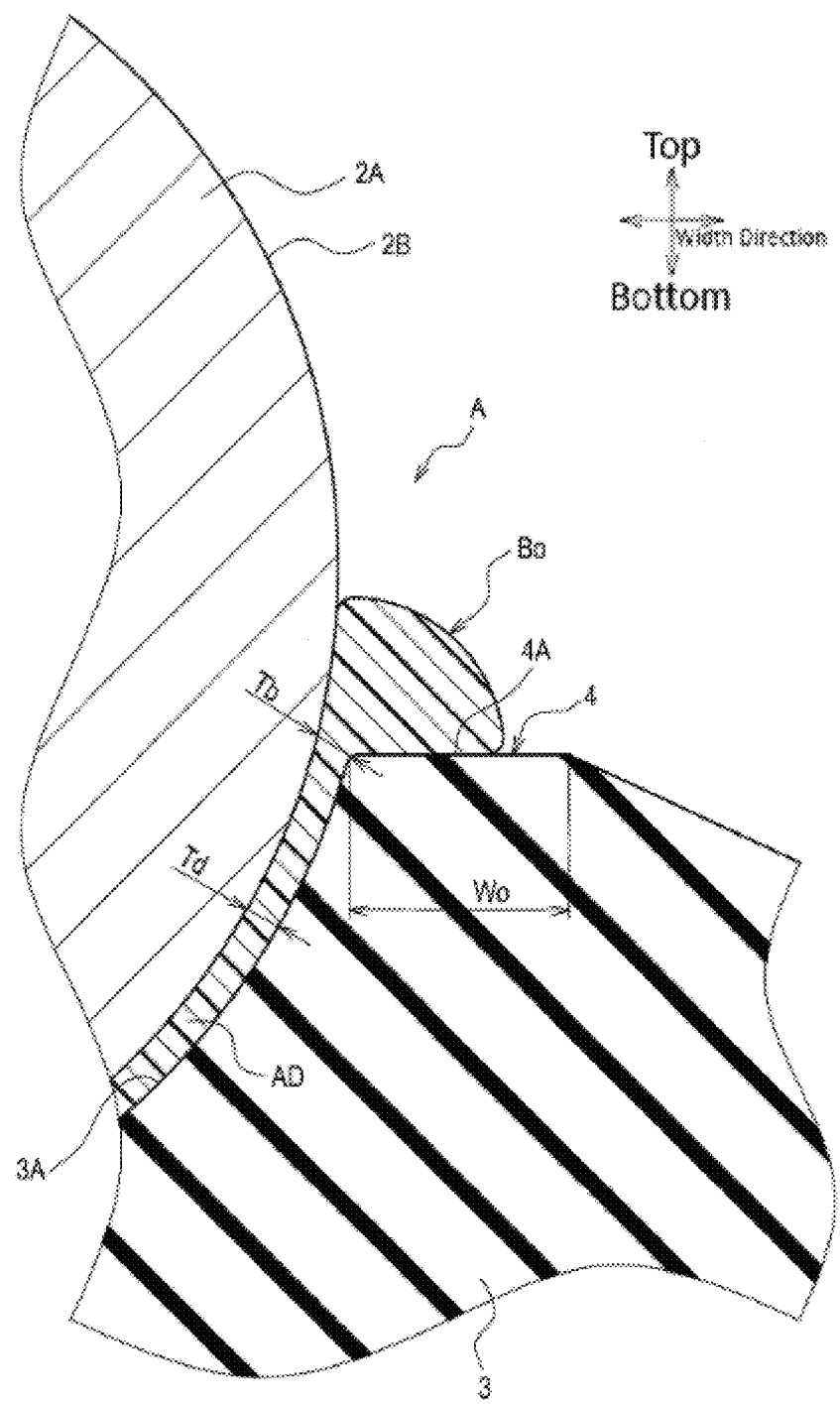
FIG. 4 is a diagram showing a part A of FIG. 3, which is a characteristic part of the first embodiment.

As shown in FIG. 4, in the adhesion part A, the minimum thickness dimension Tb of the adhesive overflowing from the groove section 3A (hereinafter referred to as the overflow part Bo) is greater than or equal to the thickness dimension Td of the adhesion layer AD formed in the groove section 3A.

Specifically, an adhesive accumulation portion 4 on which the adhesive is accumulated to restrict the flow of the adhesive is provided at an end portion of the groove section 3A in the width direction. The adhesive accumulation portion 4 of this embodiment is constituted by a planar section 4A provided at an end portion of the groove section 3A in the width direction and configured in a substantially planar shape. As shown in FIG. 4, the planar section 4A constituting the adhesive accumulation portion 4 of this embodiment spreads from the upper end of the end portion of the groove section 3A in the width direction in a substantially horizontal direction.

The minimum thickness dimension Tb of the overflow part Bo is, for example, a dimension substantially equal to the distance between positions of the planar section 4A and the wire 2A that are closest to each other in the structure shown in FIG. 4. The thickness dimension Td of the adhesion layer AD refers to, for example, a minimum thickness dimension of the adhesion layer AD, or a thickness dimension of the adhesion layer AD at a position close to the minimum thickness dimension Tb.

In this embodiment, the size of the adhesive accumulation portion 4, i.e., the width dimension Wo of the planar section 4A is determined in such a manner that the minimum thickness dimension Tb of the overflow part Bo is greater than the thickness dimension Td of the adhesion layer AD.

3. Characteristics of the Spring of this Embodiment

Figure 5:
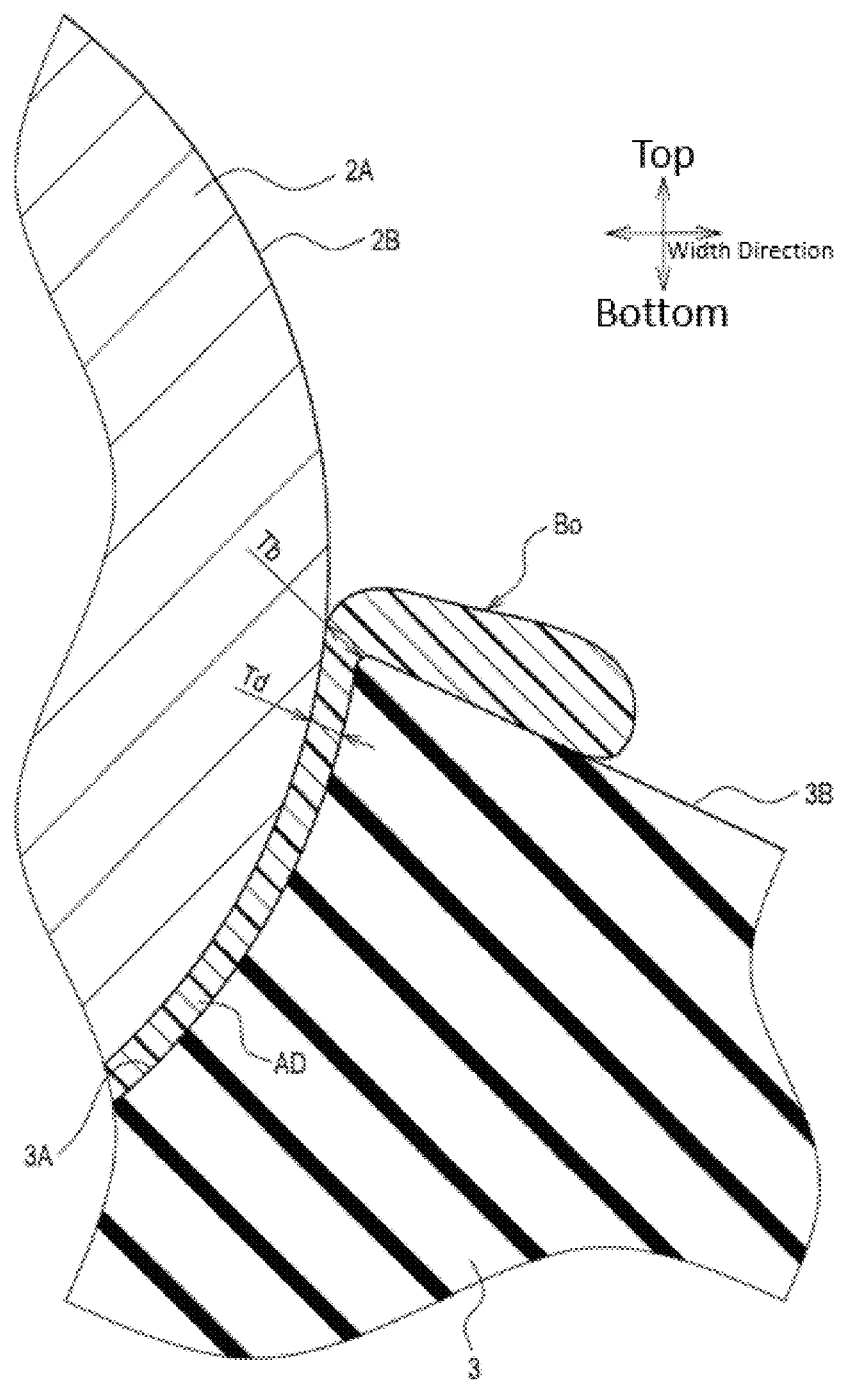
FIG. 5 is a diagram for illustrating a comparative example.

As shown in the comparative example of FIG. 5, in the case where the adhesive accumulation portion 4 are not provided at the end portion of the groove section 3A in the width direction, the adhesive overflowing to end of the groove section 3A in the width direction flows along the upper surface 3B of the seat section 3, therefore there is an extremely high possibility that the minimum thickness dimension Tb of the overflow part Bo becomes too small.

In contrast, in this embodiment, since the adhesive overflowing to end of the groove section 3A in the width direction is accumulated on the adhesive accumulation portion 4, the minimum thickness dimension Tb of the overflow part Bo can be suppressed from becoming too small. Therefore, the breakage of the overflow part Bo is suppressed, so that early damage of the spring section 2 can be suppressed.

Second Embodiment

Figure 6:
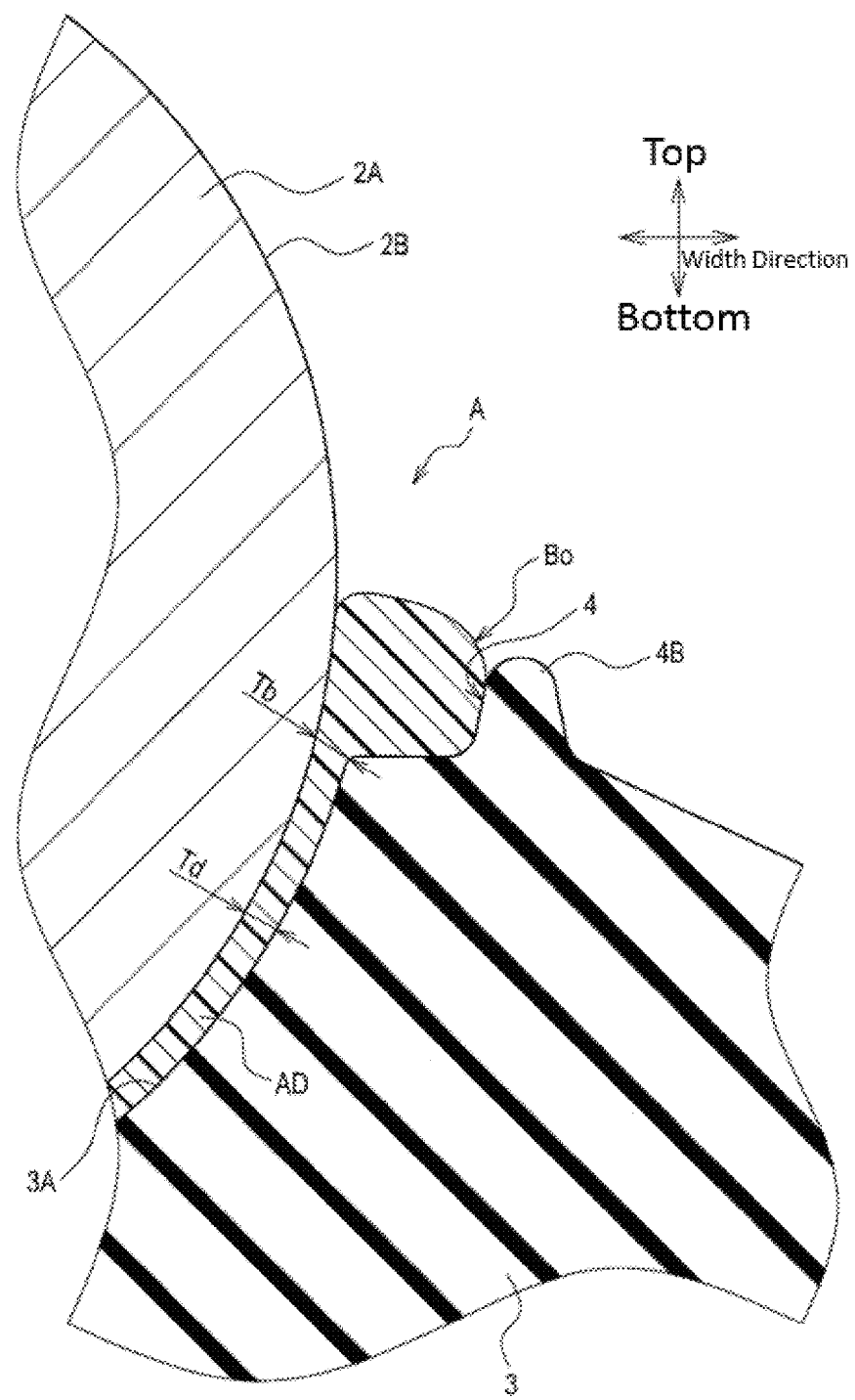
FIG. 6 is a diagram showing a characteristic part of a second embodiment of the invention, which corresponds to the part A of FIG. 3.

As shown in FIG. 6, the adhesive accumulation portion 4 of this embodiment is constituted by a weir 4B provided at an end portion of the groove section 3A in the width direction. The weir 4B is constituted by a protruding strip extending along the groove section 3A in a state where it protrudes upward from the end portion of the groove section 3A in the width direction.

Thus, the adhesive overflowing to end of the groove section 3A in the width direction is blocked by the weir 4B, and hence the adhesive overflowing to the end of the groove section 3A in the width direction is accumulated in the adhesive accumulation portion 4. Therefore, the minimum thickness dimension Tb of the overflow part Bo can be suppressed from becoming too small.

The same constituent elements and the like as those in the above embodiment are marked with the same reference numerals as in the above embodiment. Therefore, a repeated description is omitted in this embodiment.

Third Embodiment

Figure 7:
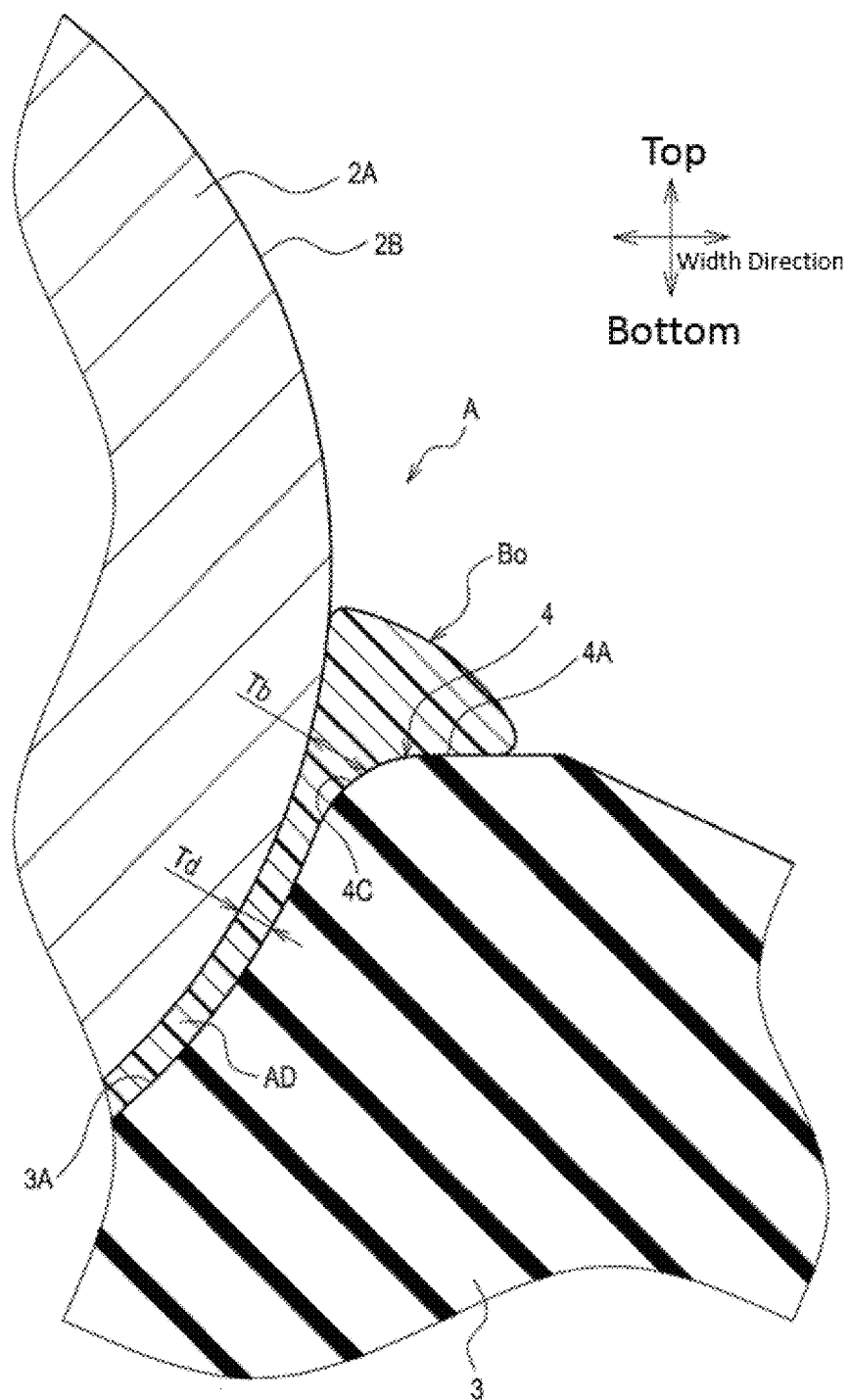
FIG. 7 is a diagram showing a characteristic part of a third embodiment of the invention, which corresponds to the part A of FIG. 3.
Figure 8:
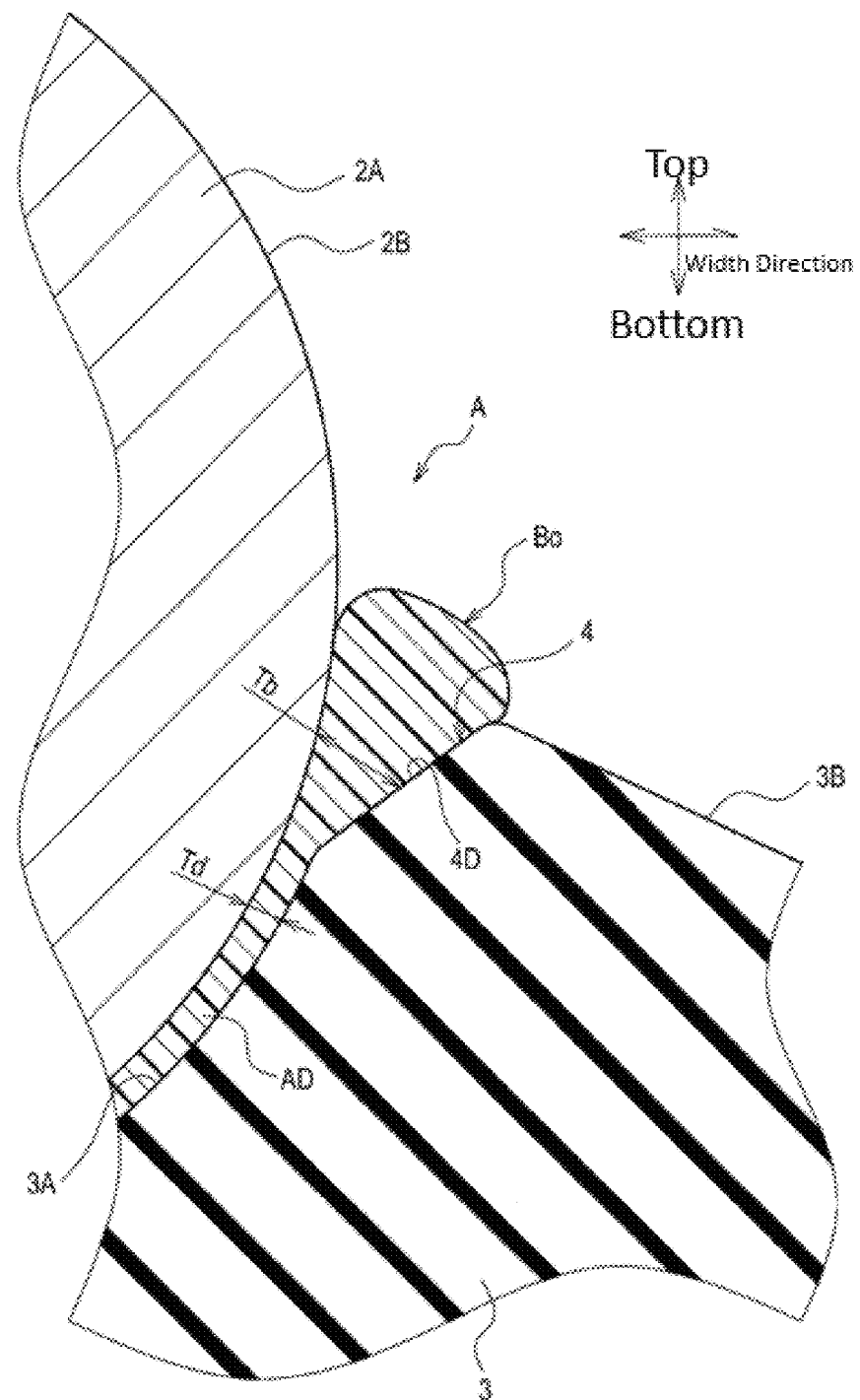
FIG. 8 is a diagram showing the characteristic part of the third embodiment, which corresponds to the part A of FIG. 3.

The adhesive accumulation portion 4 of the first embodiment is constituted by a planar section 4A spreading from the upper end of an end portion of the groove section 3A in the width direction in a substantially horizontal direction (see FIG. 4). In contrast, in this embodiment, as shown in FIGS. 7 and 8, the planar section 4A or the upper surface 3B is connected to the inner wall surface of the groove section 3A by a curved surface 4C or a flat surface 4D.

Thus, the adhesion layer AD has a thickness increasing as it approaches the end portion of the groove section 3A in the width direction, and hence the minimum thickness dimension Tb of the overflow part Bo can be suppressed from becoming too small.

The same constituent elements and the like as those in the above embodiments are marked with the same reference numerals as in the above embodiments. Therefore, a repeated description is omitted in this embodiment.

Other Embodiments

In the above embodiments, the adhesive accumulation portion 4 is used so that the minimum thickness dimension Tb of the overflow part Bo is greater than or equal to the thickness dimension Td of the adhesion layer AD. However, the invention disclosed in the specification of the present disclosure is not limited thereto. In other words, structures other than the adhesive accumulation portion 4 may be used, provided that the minimum thickness dimension Tb is greater than or equal to the thickness dimension Td of the adhesion layer AD.

The weir 4B of the second embodiment is a protruding strip extending continuously along the groove section 3A. However, the structure of the weir 4B is not limited to a protruding strip extending continuously along the groove section 3A. In other words, for example, it may be constituted by a plurality of protrusions or the like dispersed along the groove section 3A, or may be constituted by one protrusion or protruding strip.

Furthermore, the present disclosure is not limited to the above embodiments, without departing from the gist of the invention recited in the claims. Therefore, at least two of the above multiple embodiments may be combined.

The invention claimed is:

1. A spring for a suspension device, for use in a suspension device for a vehicle, comprising:
   a wire made of metal, constituting a spring section, and provided with a coating layer on a surface of the wire; and
   a seat section made of an elastically deformable material, bearing load acting on the spring section, having a groove section into which the wire is fitted, and adhered to the wire by an adhesive,
   wherein a minimum thickness dimension of the adhesive overflowing from the groove section is greater than or equal to a thickness dimension of an adhesion layer formed in the groove section,
   wherein an adhesive accumulation portion is provided at an end portion of the groove section in a width direction, wherein the adhesive accumulation portion is constituted by a protruding strip, wherein the protruding strip extends along the groove section in a state where the protruding strip protrudes from the end portion of the groove section in the width direction, and a plane extending along the width direction is provided between the protruding strip and the end portion of the groove section in the width direction.

2. The spring for a suspension device according to claim 1, wherein the thickness dimension of the adhesion layer formed in the groove section increases along a direction toward the end portion of the groove section in the width direction.

3. The spring for a suspension device according to claim 1, wherein the elastically deformable material is rubber.

4. The spring for a suspension device according to claim 1, wherein the elastically deformable material is resin.

* * * * *